Dec. 20, 1960  R. H. STAMM ET AL  2,965,530
METHOD FOR JOINING DISSIMILAR MATERIALS
Filed Aug. 18, 1954
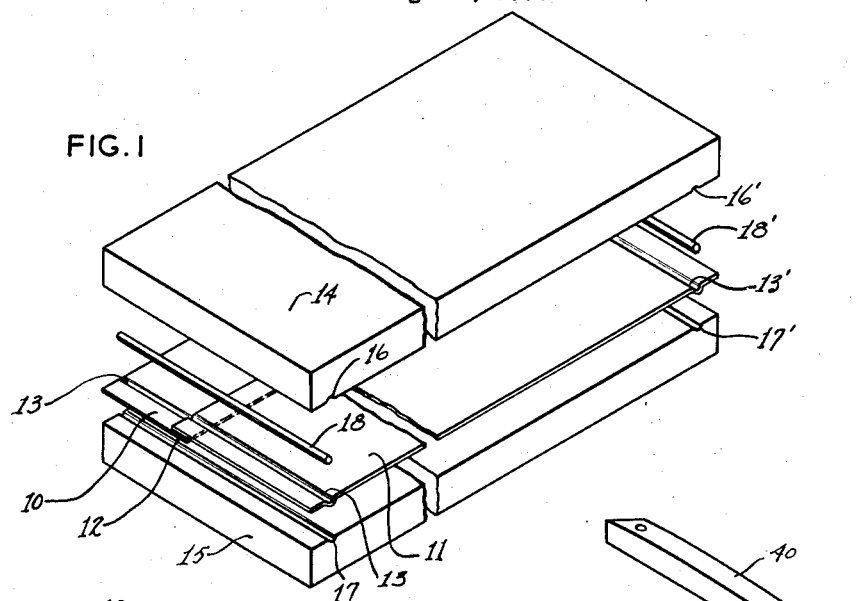
FIG. 1
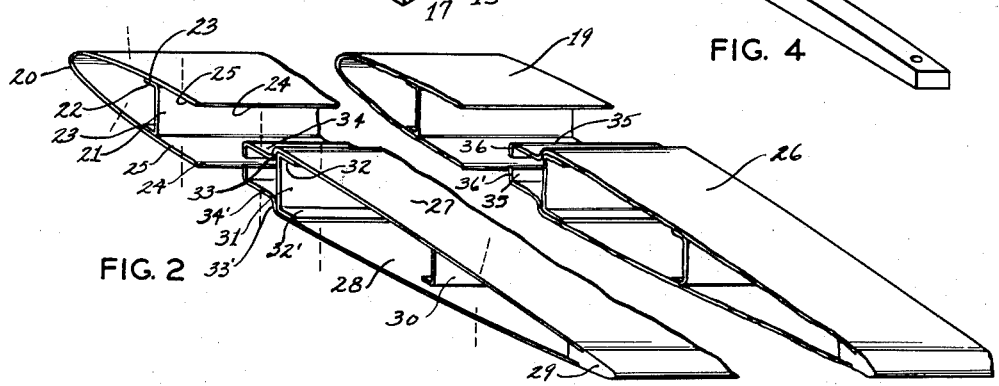
FIG. 4
FIG. 2
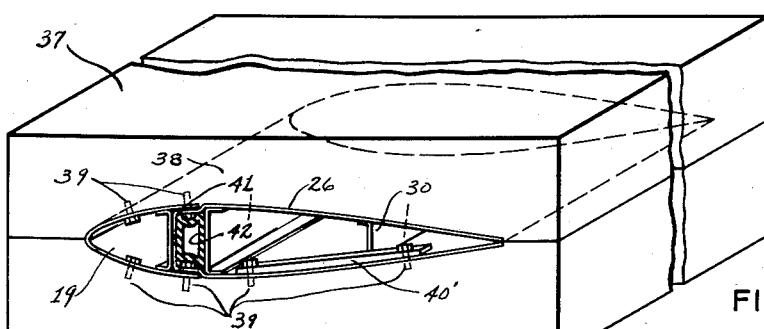
FIG. 3
*INVENTOR.*
ROBERT H. STAMM & ALB C. BALLAUER
BY Jerome A. Gross,
ATTORNEY United States Patent Office 2,965,530
Patented Dec. 20, 1960

2,965,530

METHOD FOR JOINING DISSIMILAR MATERIALS

Robert Henry Stamm and Alb C. Ballauer, Traverse City, Mich., assignors to Parsons Corporation, Detroit, Mich., a corporation of Michigan Filed Aug. 18, 1954, Ser. No. 450,612

5 Claims. (Cl. 154—116)

The present invention relates to the fabrication of articles employing dissimilar materials joined at a temperature different from the range of anticipated service temperatures. It has particular application in making long structural joints between metals having different thermal expansion properties, utilizing joining processes requiring substantially elevated temperatures. One utilization of the present invention, and a new product thereof, is a spanwise-bonded composite steel and aluminum helicopter rotor blade. The process of fabrication and new fixtures of the invention are well suited for the manufacture of other composite structures, and they are of great value not only where strength and reliability are required, but also wherever a smooth, wave-free surface is desired.

The objects of the present invention include:

Overcoming thermal effects in fabricating lengthwise joints of members having different coefficients of thermal expansion, where such members are joined at temperatures substantially different from service temperatures.

Realizing the full strength of the bond adhesives used for joining such members, free from residual stresses.

Providing a method of fabrication of, and a new article of manufacture consisting of a helicopter rotor blade having a steel leading edge and an aluminum aft portion, joined together at elevated temperature in such a manner as to be substantially free from residual stresses at service temperatures, thereby to avoid skin wrinkling and to achieve greater joint strength and endurance.

Providing fixtures for use in fabricating elongated joints between two parts having different coefficients of thermal expansion where the fabrication is to take place at a temperature substantially different from service temperature of the joined parts.

Other objects will be apparent from this specification as a whole.

The problem of fabricating long joints between materials having dissimilar coefficients of thermal expansion is illustrated by a situation in which it may be desired to bond a steel sheet to a thin aluminum sheet in a lap joint, using any one of the vulcanized or heat-cured adhesives. Such adhesives characteristically require vulcanizing at temperatures of 350° F. or more, and the application of continuous pressure during the curing cycle.

When two strips of materials as different in their thermal properties as steel and aluminum are bonded together at an elevated temperature, the difference in their contraction on cooling causes residual stresses. Stated simply, the greater shortening of the aluminum accompanying cooling is resisted by the lesser shortening of the steel. These balance each other through shear stresses in the bonded joint, which stresses may be accompanied by substantial warpage or "oil-canning" of the thinner gauge material. Both the residual stresses and the warpage impair the strength of the joint, and peeling may be commenced, especially if the joint is subjected to loads which flex the warped material.

In the present invention, novel fixtures are employed to apply tension to the piece of material which would be the shorter at joining temperature, so as to hold it elongated in registration with the other material. Embodiments of the invention are illustrated in the accompanying drawings (1 sheet) in which:

Figure 1 is an exploded perspective view of a simple fixture embodying the present invention, adapted for use in making a long lap bond between two substantially flat strips of sheet material shown between the fixture halves.

Figure 2 is a cabinet projection of a helicopter rotor blade leading edge structure and aft structure, shown prior to the bonding thereof in accordance with the present invention.

Figure 3 is an end view of the helicopter rotor blade of Figure 2, shown in place within the halves of a hollow bonding fixture embodying the present invention, before attachment of an upper inside clamp.

Figure 4 is a perspective view of an upper inside clamp for use with the bonding fixture shown in Figure 3.

Referring now to Figure 1, there is shown an elongated piece of steel sheet 10 (or other material having a relatively low coefficient of thermal expansion), an aluminum sheet 11 (or other material having a relatively high coefficient of thermal expansion), the edges of said sheet materials 10 and 11 being in overlapping relationship, and a strip of bonding tape 12 inserted therebetween, for bonding a single lap joint. The width of the strip 12 preferably equals the width of the overlap of the metal sheets 10, 11. The sheets 10 and 11 are cut somewhat longer than the desired length of the finished article, so that they may be trimmed to length. Adjacent the left end of each sheet 10, 11 is a nesting groove 13, and adjacent the right end of each is a nesting groove 13'. The spacing between the grooves 13, 13' is the same for each sheet at room temperature, so that at the start of the process these grooves 13, 13' will align the sheets 10, 11 with each other.

For bonding the above-described lap joint between the sheets 10 and 11, there is utilized a fixture consisting of a pair of opposed platens, an upper platen 14 and a lower platen 15. These platens 14, 15 are both made of material having a coefficient of thermal expansion at least as great as that of the aluminum sheet 11 (which has the greater coefficient of the materials joined). The upper platen 14 has clamping grooves 16, 16' adjacent its ends and spaced equal to the spacing of the nesting grooves 13, 13' of the sheet materials. The lower platen 15 has similarly spaced clamping grooves 17, 17'. Clamping rods 18, 18' are provided, for use in the manner hereinafter described; these are of a diameter adapted to fit within the clamping grooves 16, 16' of the upper platen 14.

To carry out the process of the present invention, the steel sheet 10 and the aluminum sheet 11 are arranged in overlapping relationship with the bonding tape 12 therebetween, as above mentioned, and the parts are placed upon the lower platen 15, with the nesting grooves 13, 13' in registration with the clamping grooves 17, 17'. The clamping rods 18, 18' are then placed upon the nesting grooves 13, 13', the upper platen 14 is clamped over the assembly so that its clamping grooves 16, 16' will engage the clamping rods 18, 18', and pressure is applied between the platens 14, 15. Thereafter, the clamped assembly is subjected to heat curing at temperature, say 350° F. for the required curing time.

As the heat is applied the aluminum sheet 11 tends to expand and therefore elongate much more rapidly than the steel sheet 10. However, the platens 14, 15, if formed of aluminum, expand at the same rate as the expansion of the sheet 11. By reason of the clamping, the steel sheet 10 will be elongated in tension between the clamping grooves 16, 17 and 16', 17'. If the platens 14, 15 be made of a material having a greater coefficient of thermal expansion than aluminum, their expansion will cause an elongation in tension of both the steel sheet 10 and the aluminum sheet 11, at the same rate with each other.

The tension imposed by the platens 14, 15 during their heating eliminates differential or unequal elongation of the sheet materials 10, 11, despite their different coefficients of thermal expansion. After the curing cycle has been completed, the clamped assembly is allowed to cool, so that the tension applied by the platens 14, 15 is gradually released. When the clamped assembly returns to room temperature, the platens 14, 15 and the clamping rods 18, 18' are removed leaving the sheets 10, 11 bonded together in a joint which is free from residual stresses and unwarped.

The range of service temperatures may be close enough to room temperature that the bonded article may be used thereafter without being subjected to thermal warpage. It is possible, however, that an article might be intended for use at a temperature different from room temperature, for instance, under Arctic conditions. In such case, the sheets 10, 11 and the platens 14, 15 would all be reduced to Arctic service temperature before forming the nesting grooves 13, 13'; and the assembly of the sheets 10, 11 with the clamping rods 18, 18' and the platens 14, 15 would take place at such lowered temperature. After vulcanizing and on reduction of the temperature of the assembly to room temperature, there might be a slight degree of warpage and residual stress in the bonded joint; but these would be relieved on reducing the temperature of the bonded assembly to such Arctic service temperature.

Helicopter rotor blades are typical of structures having elongated spanwise joints; for their construction, steel leading edge primary structure may be utilized for its strength and ruggedness, its reliability under fatigue loadings, and because of the advantages of having the structural weight as far forward as possible. The aft blade structure may be fabricated of light weight sheet material, such as aluminum, joined by adhesive bonding. An example of such rotor blade construction is shown in the co-pending application of Robert H. Stamm, Harry D. Fox and Stanley Steed, Serial No. 387,452, filed October 21, 1953, now Patent No. 2,884,078.

A similar blade is depicted in Figure 2. The steel primary structure consists of a spar generally designated 19, made up of a heavy rolled steel leading edge trough 20, into which is brazed a channel web 21 having forward facing flanges 22 which fit snugly within the inner surface of the trough 20 and are brazed therein by continuous spanwise upper and lower brazed seams 23. The channel web 21 is positioned somewhat forward of the tapering trough edges 24. The portions of the inner trough surface between the edges 24 and the channel web 21 are designated the spanwise inner trough margins 25.

The aluminum aft blade structure subassembly, generally designated 26, comprises an upper skin 27 and a lower skin 28, adhesively joined at their trailing edges to a trailing edge arrowhead extrusion 29 supporting the skins 27, 28. Spacedly forward of the arrowhead extrusion 29 is an aft spanwise channel 30, and spacedly forward thereof is a spreader channel 31 having backward bent upper and lower flanges 32, 32'. The bends of the channel flanges 32, 32' nest in upper and lower inward joggles 33, 33' of the upper and lower skins 27, 28, respectively. Forward of the joggles 33, 33', the skins 27, 28 continue in the formation of the spanwise upper and lower skin margins 34, 34', having inward right angle bends 35 and terminating in the upper and lower forward edges 36, 36'.

The steel spar 19 and the portions of the upper and lower skins 27, 28 forward of the spreader channel 31 are to be joined by a vulcanized adhesive bond. The upper and lower free forward edges 36, 36' of the skins are formed to fit closely against the aft side of the steel channel web 21; the upper and lower forward skin margins 34, 34' against the spanwise inner trough margins 25; and the inward skin joggles 33, 33' against the tapering trough edges 24. These portions of the aft blade structure 26 are designed to spread outward and "set" against the mating portions of the spar 19 as the adhesive bond material flows during vulcanizing. The temperature at which the joint is so "set" or cured is referred to hereafter as "joining temperature."

The present invention assures the perfect, undisturbed registration of these parts from room temperature, at which the parts are arranged for bonding, throughout the heat curing cycle, and thereafter until cooled again to room temperature. The fixture shown in Figure 3, includes heavy hollowed-out upper and lower mold halves 37, 37', shown in end view in Figure 3, the length of the mold halves being as great as that of the spar 19 and the aft blade structure 26. The mold halves 37, 37' are, in the case illustrated, cast or machined from thick aluminum stock so as to provide a cavity 38 whose contour conforms precisely to the contour of the finished airfoil. Adjacent the ends of the cavity 38, it is tapped to receive a plurality of inside clamping bolts 39. In Figure 3, four of these clamping bolts hold each end of the spar 19 securely within the mold halves 37, 37'; the aft two of these also securing the forward skin margins 34, 34' of the aft blade structure subassembly 26. The end portion of the aft spanwise channel 30 is cut away slightly to permit the use of the chordwise bolted clamps 40, 40' against the inner surface of the skins 27, 28. The bolted clamps 40, 40' may be simple, rugged metal pieces having an outer contour adapted to press and hold the upper and lower skins 27, 28 against the cavity 38 of the mold halves 37, 37'. The are held in place by clamping bolts 39 tightened in tapped bores in the mold halves 37, 37'.

Adhesive bonding tape 41 is inserted between the surfaces to be bonded together prior to their assembly in the mold halves 37, 37'. Assuming that the rotor blade will be subjected to a range of service temperatures of from minus 60° F. to plus 160° F., it is satisfactory to perform all these preliminary mounting operations at room temperature of approximately 70°, which is near the mid-point of the range of service temperatures. The mold halves 37, 37' are then securely clamped together by means not illustrated. An elongated flexible hose-like bag 42, shown in cross-section in Figure 3, is then inserted to provide constant follow-up pneumatic pressure during the bonding operation.

The clamped mold halves 37, 37', with the spar 19 and aft blade subassembly 26 mounted therein for bonding under pneumatic pressure of the air bag 42, are then subjected to a curing temperature of say 350° F. for 25 to 30 minutes, or such other curing time and temperature as may be appropriate for the particular adhesive. Such elevation of temperature causes thermal elongation of the aluminum mold halves 37, 37'. The four clamping bolts 39 in each end of the steel spar 19 place it under tension; its elongation under tension plus its thermal elongation must equal the elongation of the mold halves 37, 37'. The aft structure 26, being of the same material as the mold halves 37, 37' is not subjected to such tension (provided the heating is even); nevertheless, it is similarly clamped to avoid any possibility of distortion.

The adhesive bonding tape 41 is vulcanized under the heat, and the pressure of the air bag 42 effects an intimate bond between the surfaces adjacent it. After terminating the curing heat, the assembly is permitted to cool, which involves thermal shrinkage of all the aluminum at a substantially greater rate than the steel. However, as the aluminum mold halves 37, 37' contract on cooling, they relieve the tension theretofore exerted by them on the spar 19. Accordingly, the contraction of the spar 19 attendant the relief of heat and tension proceeds simultaneously with the contraction of the aft structure 26. The adhesive bond is not subjected to any substantial shear or peeling tendency by such contraction. When the assembly has reached room temperature, the mold halves 37, 37' and the air bag 42 are removed, leaving the spar 19 and the aft structure 26 bonded together in the same alignment as they were prior to the application of heat, and without residual stresses, warping or "oil-canning." Accordingly, the bonds develop the full strength of the bond adhesive, as if the metals joined were thermally similar.

As has been mentioned, to assure bond strength it is important to avoid mechanical flexing, especially of the thinner material. In the embodiment illustrated, this is effected by nesting the spreader channel 31 within the joggles 33, 33', avoiding any local deflection of the aft skins 27, 28 adjacent the critical spanwise joints.

It will be apparent that the steel spar 19, during its extension by the mold halves 37, 37' accompanying their thermal expansion, will impose a compressive force on the mold halves 37, 37' equal in magnitude to the tension force which they apply to it. It is necessary therefore that the mold halves 37, 37' possess a substantially greater structural rigidity than the spar 19; it is suggested that a structural rigidity of the order of 100 times that of the spar 19 is in order. Obviously, the compressive strain on the mold halves 37, 37' should not be appreciable, or it would interfere with the free thermal expansion of the aft structure 26. If the mold halves 37, 37' be made of some material having an even greater coefficient of thermal expansion than that of the aft blade structure 26, it would not be necessary to have such a great excess of rigidity of the mold halves 37, 37' over that of the spar 19. While the problem may be solved by familiar engineering calculations, these will ordinarily not be necessary, for the results of the present invention have been uniformly good.

In both the embodiments pictured, the fixture is seen to be subjected to compression at joining temperatures. The fixture must rigidly resist this loading, and may be thought of as a rigid column.

Although the illustrations hereof show the formation of lap joints, the present invention is of great value as used with butt joints of dissimilar materials. Relatively thick rigid thermally dissimiliar members could not heretofore be butt-joined at elevated temperatures without causing extreme shear stresses on cooling, endangering the joint or subjecting it to such great warpage as to make it useless.

Nor is the present invention limited to bonding processes. Both low and high temperature brazing of dissimilar materials are made possible by it; heretofore such processes were not feasible for relatively long continuous joints. In fact, the present invention will be found to be adapted for use with processes which in general involve the joining of dissimilar materials at temperatures other than service temperatures. Included are those processes in which the joining temperatures may be lower than service temperatures; in such case all elements to be joined are raised to approximately service temperature before being assembled to the fixture. Note, however, that if steel and aluminum were to be joined at a temperature less than service temperature, the steel would shorten less at the joining temperature; accordingly, steel mold halves would be utilized instead of aluminum ones as herein shown for use in bonding at elevated temperatures.

Accordingly, the present invention should not be limited to the specific structures here illustrated, but should be deemed as fully co-extensive with the inventive principles disclosed.

We claim:

1. A method for overcoming thermal effects in making lengthwise joints of members formed of materials having different coefficients of thermal expansion, for use in a range of service temperatures substantially different from the joining temperature, comprising the steps of bringing the temperature of the members to be joined within the range of service temperatures, positioning then-equal lengths of said members for joining, independently bringing to substantially the same temperature a fixture formed of a material having a coefficient of thermal expansion similar to that of the member which, if free, would be the longer at joining temperature, securing the ends of the members so positioned to such fixture, bringing the fixture and the members secured thereto to joining temperature, whereby the member whose coefficient of thermal expansion is different from that of the fixture will be held by the fixture elongated in tension sufficiently to compensate substantially for the dissimilarity of thermal coefficients of the materials to be joined, then joining, then bringing the temperature of the fixture and the joined members to within the range of service temperatures, then releasing the members so joined from the fixture.

2. A method for overcoming thermal effects in the fabrication of heat-cured bonded joints between members formed of materials having different coefficients of thermal expansion, comprising the steps of arranging the members to be joined with bonding material therebetween for joining, and securing the ends of the members at room temperature to a rigid fixture formed of a material having a coefficient of thermal expansion at least as great as that of the material having the greater coefficient, elevating the temperature of the fixture and the members secured thereto to bond-curing temperature, curing the bond, and releasing the bonded members from the fixture.

3. A method of making wrinkle-free, heat-cured, spanwise bonds between steel forward airfoil structures and aluminum sheet aft structures, comprising the steps of arranging the forward margin of such aft structure inwardly of an overlapping the rear margin of such forward structure in a spanwise lap joint with bonding material therebetween, securing the structures so arranged by their ends within a hollow aluminum column having an airfoil-shaped cavity wall adapted to resist bonding pressure, applying bonding pressure along said lap joint outwardly from within the aft structure against the resistance of the cavity wall, raising the temperature of the structures and column to bond-curing temperature and curing the bond, and lowering the temperature, relieving the pressure and removing the bonded structure from the column.

4. A method of avoiding bond defects in the heat-cured bonding of spanwise bonds between a steel structure and a structure formed of material having a higher coefficient of thermal expansion than steel, comprising the steps of arranging such structures with their spanwise edges aligned for bonding and with bond material therebetween and securely affixing the ends of the steel structure to a rigid fixture formed of material having a coefficient of thermal expansion substantially as high as that of the other material, the structures and fixture being at substantially the same temperature and within the range of intended service temperatures, then elevating the temperatures of the materials and of the fixture to heat-curing temperature until the bond is cured, whereby the steel structure is subjected to tensile and thermal elongation along the spanwise joint correspondingly to the thermal elongation of the fixture accompanying the elevation of temperature, then reducing the temperature of the bonded structure and fixture to a value within such range of service temperatures, and then removing the bonded structure from the fixture.

5. A method of forming warp-free heat cured bonds of sheet material having different coefficients of thermal expansion, comprising the steps of arranging the dissimilar sheet materials in a lap joint with bonding material inserted in the joint, securely clamping the sheet materials so arranged at each end of the lap joint between rigid platens formed of material having a coefficient of thermal expansion at least as great as that of the sheet material having the greater coefficient, applying heat to the platens and applying pressure therebetween whereby the bonding material is cured, ceasing the application of heat, releasing the clamped platens and removing the joined materials from the platens.

References Cited in the file of this patent

UNITED STATES PATENTS

| | | |
|---|---|---|
| 757,582 | Wachwitz | Apr. 19, 1904 |
| 1,952,569 | Smith | Mar. 27, 1934 |
| 2,149,507 | Camfield | Mar. 7, 1939 |
| 2,276,004 | Vidal et al. | Mar. 10, 1942 |
| 2,299,778 | Wissler | Oct. 27, 1942 |
| 2,304,718 | Swart | Dec. 8, 1942 |
| 2,366,164 | Weick | Jan. 2, 1945 |
| 2,371,847 | Saunders et al. | Mar. 20, 1945 |
| 2,401,987 | Taylor et al. | June 11, 1946 |
| 2,505,197 | McCulloch et al. | Apr. 25, 1950 |
| 2,514,525 | Stulen | July 11, 1950 |
| 2,519,588 | McCulloch | Aug. 22, 1950 |
| 2,535,917 | Gruetjen | Dec. 26, 1950 |
| 2,559,087 | Philipp | July 3, 1951 |
| 2,574,980 | Meyers | Nov. 13, 1951 |
| 2,653,889 | Hager et al. | Sept. 29, 1953 |
| 2,679,468 | Pitman | May 25, 1954 |
| 2,741,498 | Elliott | Apr. 10, 1956 |
| 2,830,002 | Mohs | Apr. 8, 1958 |